Dec. 23, 1969  J. C. VISSER  3,485,477
GATE VALVE WITH SEAT HAVING MERGING INCLINED FACES
Filed June 6, 1968

9290-14

INVENTOR
JAN C. VISSER

United States Patent Office 3,485,477
Patented Dec. 23, 1969

1

3,485,477
GATE VALVE WITH SEAT HAVING MERGING INCLINED FACES
Jan C. Visser, Woensdrecht, Netherlands, assignor to N.V. Maschinefabriek en Ijzergieterij "Holland-Bergen op Zoom," Bergen op Zoom, Netherlands, a company of the Netherlands
Filed June 6, 1968, Ser. No. 735,073
Int. Cl. F16k 3/00, 3/30
U.S. Cl. 251—328     1 Claim

ABSTRACT OF THE DISCLOSURE

The invention relates to a gate valve having a casing and a closure member in said casing, said member being constituted by a valve body wedge-shaped in longitudinal section and said body being provided with a sealing ring of elastic material located in a groove of the body and being adapted to co-operate with an annular seat in the casing. The angle of inclination of the uppermost part of the seating face with respect to the direction of movement of the valve body is larger than further downwards and said part gradually merges in the adjacent lower part of the seating face.

---

Figure 1:
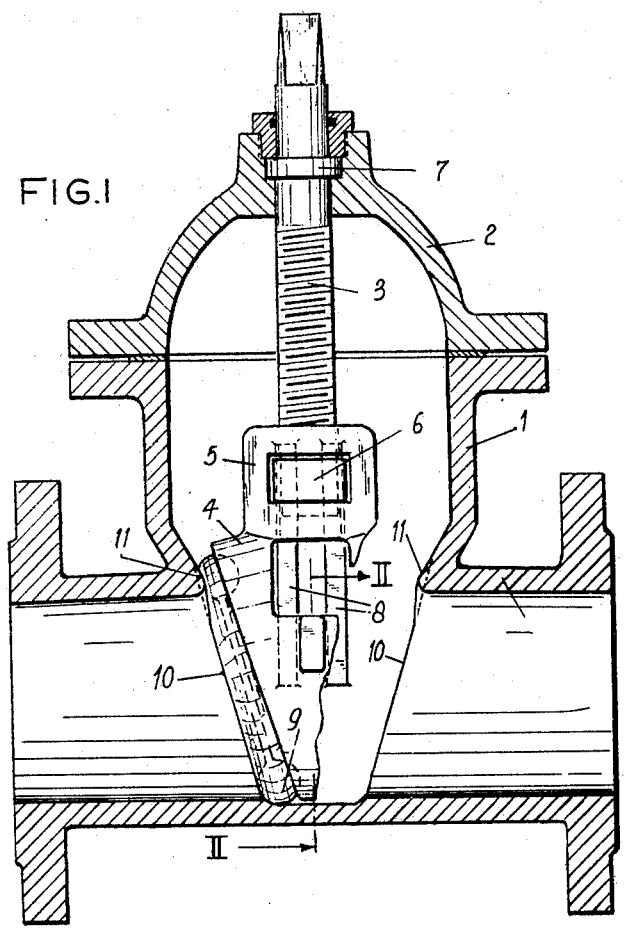

This invention relates to a gate valve having a casing and a closure member in said casing, said member being constituted by a valve body wedge-shaped in longitudinal section and said body at least at one side being provided with a sealing ring of elastic material located in a groove of the body and being adapted to be brought in sealing contact with an annular seat in the casing and at least the uppermost part of said seat constituting a plane parallel to the side face of the wedge-shaped valve body.

The fluid pressure against which a valve of this type may tightly seal is determined by the specific pressure occurring between the elastic sealing ring of the valve body and the seating face in the casing. Said specific pressure itself is obtained by the local deformation of the sealing ring. Said deformation at least at the uppermost part of the sealing ring is caused by this that the wedge-shaped valve body with its sealing ring or rings is urged between the wedge-like narrowing seating faces in the casing. The sealing ring thereby slides along the seating face in the casing and during said sliding movement the required deformation of the ring is obtained. With a valve having the seating face in the casing on its whole extent parallel to the side face of the valve body the deformation of the elastic sealing ring is obtained in the above described manner.

The degree of deformation of the sealing ring at least at the uppermost part of said ring depends on the angle of inclination of the seating face with respect to the direction of movement of the valve body and as said angle of inclination will be larger the degree of deformation of the sealing ring will be larger for an equal displacement of the valve body. Said degree of deformation also depends on the path covered by the sealing ring when sliding along the seating face and as said path will be longer also said deformation of the ring will be larger.

With a gate valve which is short in axial direction the angle of inclination of the seating face in the casing should be small and also the displacement of the valve body should be small. In consequence of said measures with the gate valves which are short in axial direction the sealing ring of the valve body at the uppermost part of the seating face will not be deformed to a sufficient degree so that the valve body in its closed position will leak.

The invention has for its object to remove said drawback of gate valves having a short axial dimension. To this end according to the invention the angle of inclination of the uppermost part of the seating face with respect to the direction of movement of the valve body is larger than further downwards and said upper part of the seating face gradually merges in the adjacent part of the seating face having its angle of inclination corresponding to that of the side face of the valve body. Due to the larger angle of inclination of the uppermost part of the seating face also at said part of the seating face a sufficient degree of deformation of the sealing ring at the valve body and therefore a proper sealing against the fluid flowing through the valve will be obtained.

Figure 2:
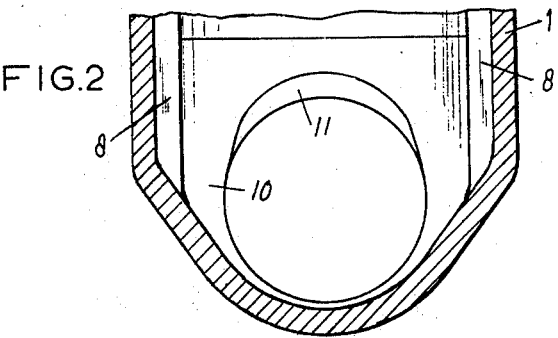

The invention will be further described with reference to the accompanying drawing showing somewhat diagrammatically an embodiment of the gate valve according to the invention. In the drawing FIG. 1 is a longitudinal sectional view of the valve with part of the valve body broken away. FIG. 2 is a cross-sectional view of the lower part of the valve casing taken on line II—II of FIG. 1.

The casing 1 which may be pressed from steel plate in two halves, is provided with a cover 2, in which the spindle 3 of the valve body 4 is supported. The valve body 4, which is partly broken away, is wedge-shaped and has a head 5 in which a nut 6 is located and the spindle 3 is threaded in said nut. As the spindle 3 by means of a collar 7 is prevented from axial displacement in the cover 2, the valve body 4 upon rotation of the spindle 3 will be vertically displaced and during said displacement the body 4 is guided at ribs 8 in the casing.

The valve body 4 at one or both of its side faces is provided with an elastic sealing ring 9 and said ring in closed position of the valve body 4 is in sealing engagement with a plane seating face 10 in the casing. The uppermost part 11 of the seating face 10 has a larger angle of inclination than the downwards extending adjacent part of said face and gradually merges in said less inclined part of said face.

What I claim is:

1. A gate valve having a casing and a closure member in said casing, said member being constituted by a valve body wedge-shaped in longitudinal section and said body at least at one side being provided with a sealing ring of elastic material located in a groove of the body and being adapted to be brought in sealing contact with an annular seat in the casing, characterized in that the angle of inclination of the uppermost part of the seating face with respect to the direction of movement of the valve body is larger than further downwards and said upper part of the seating face gradually merges in the adjacent part of the seating face having its angle of inclination corresponding to that of the side face of the valve body.

References Cited

UNITED STATES PATENTS 3,179,372    4/1965    Vaudreuil.

FOREIGN PATENTS 1,163,626    7/1962    Germany.

ARNOLD ROSENTHAL, Primary Examiner